Patented Dec. 24, 1946

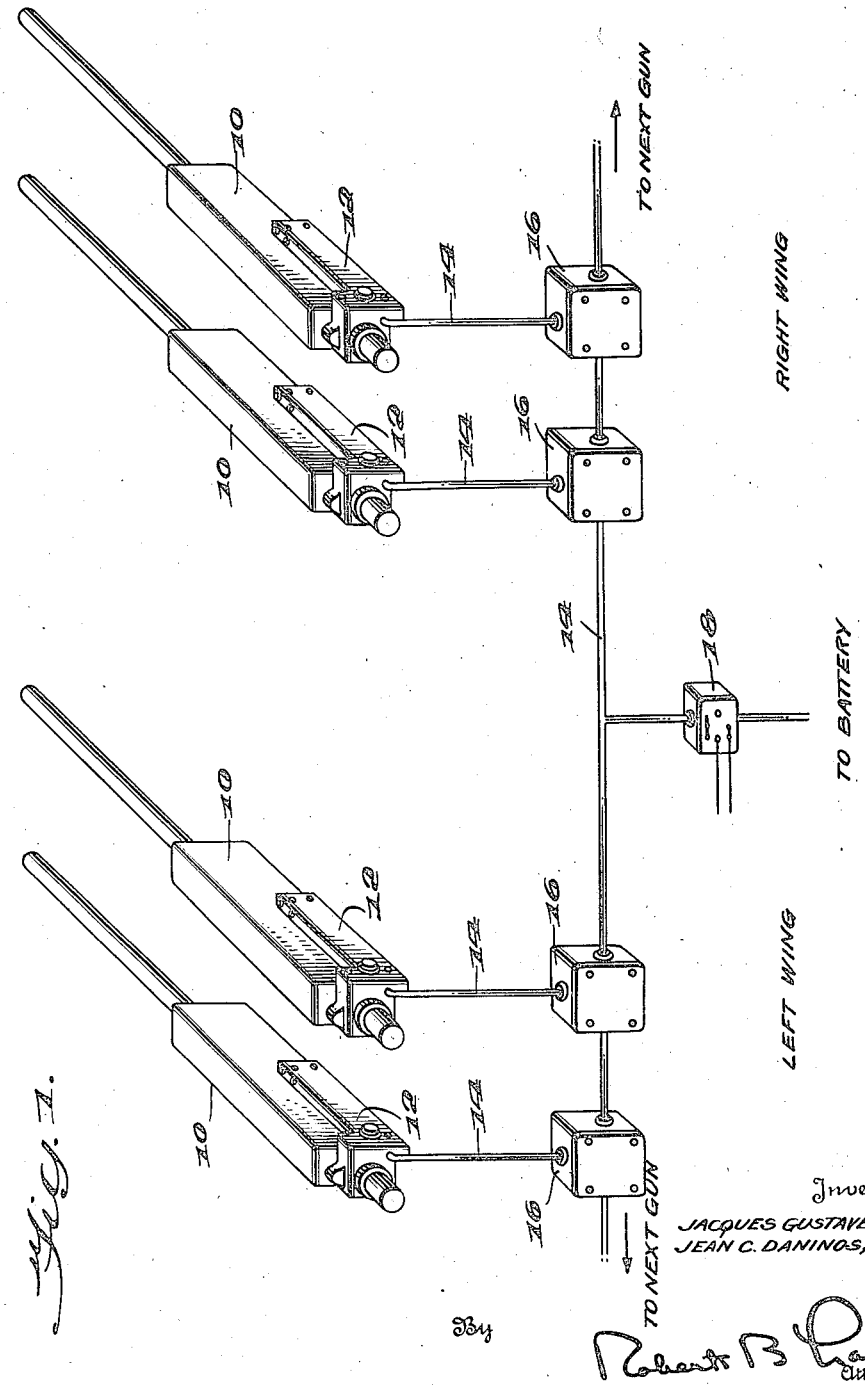

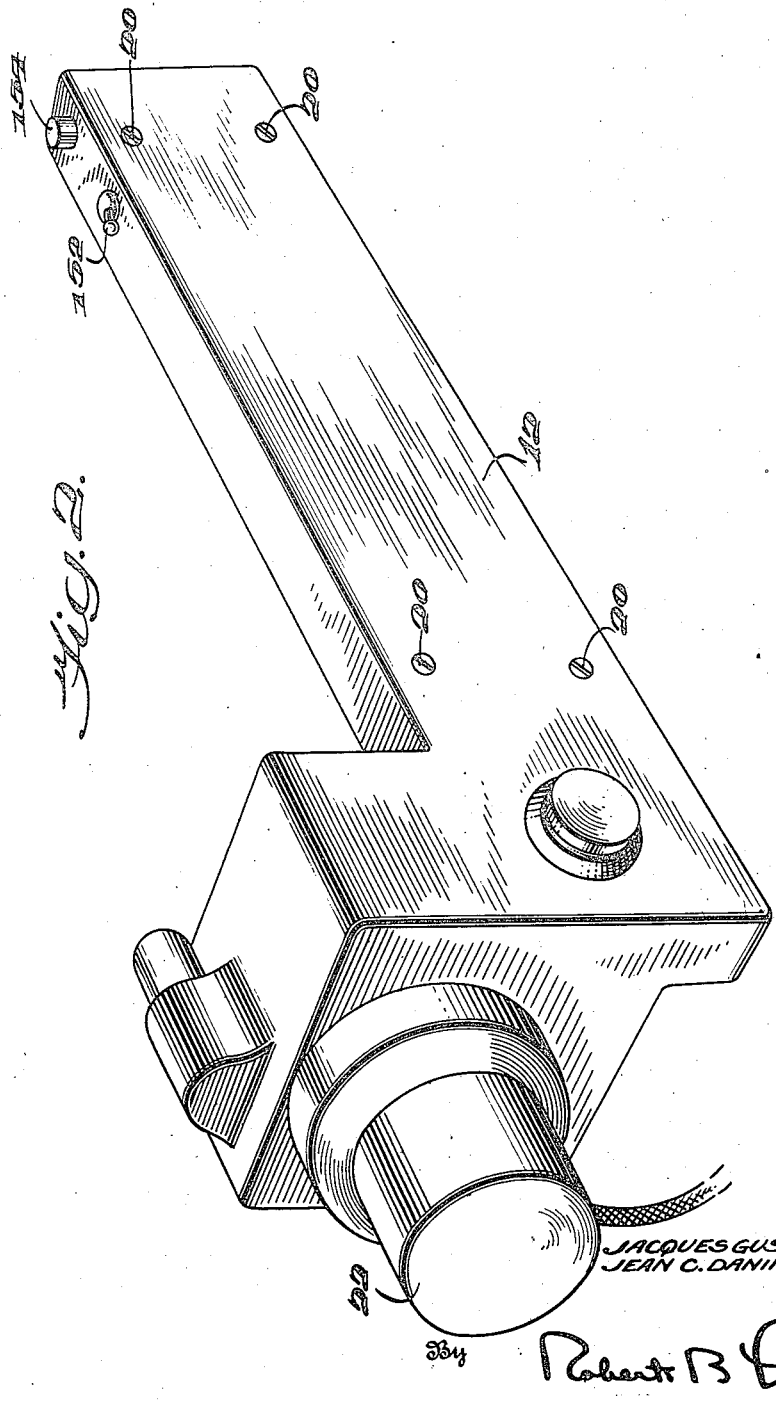

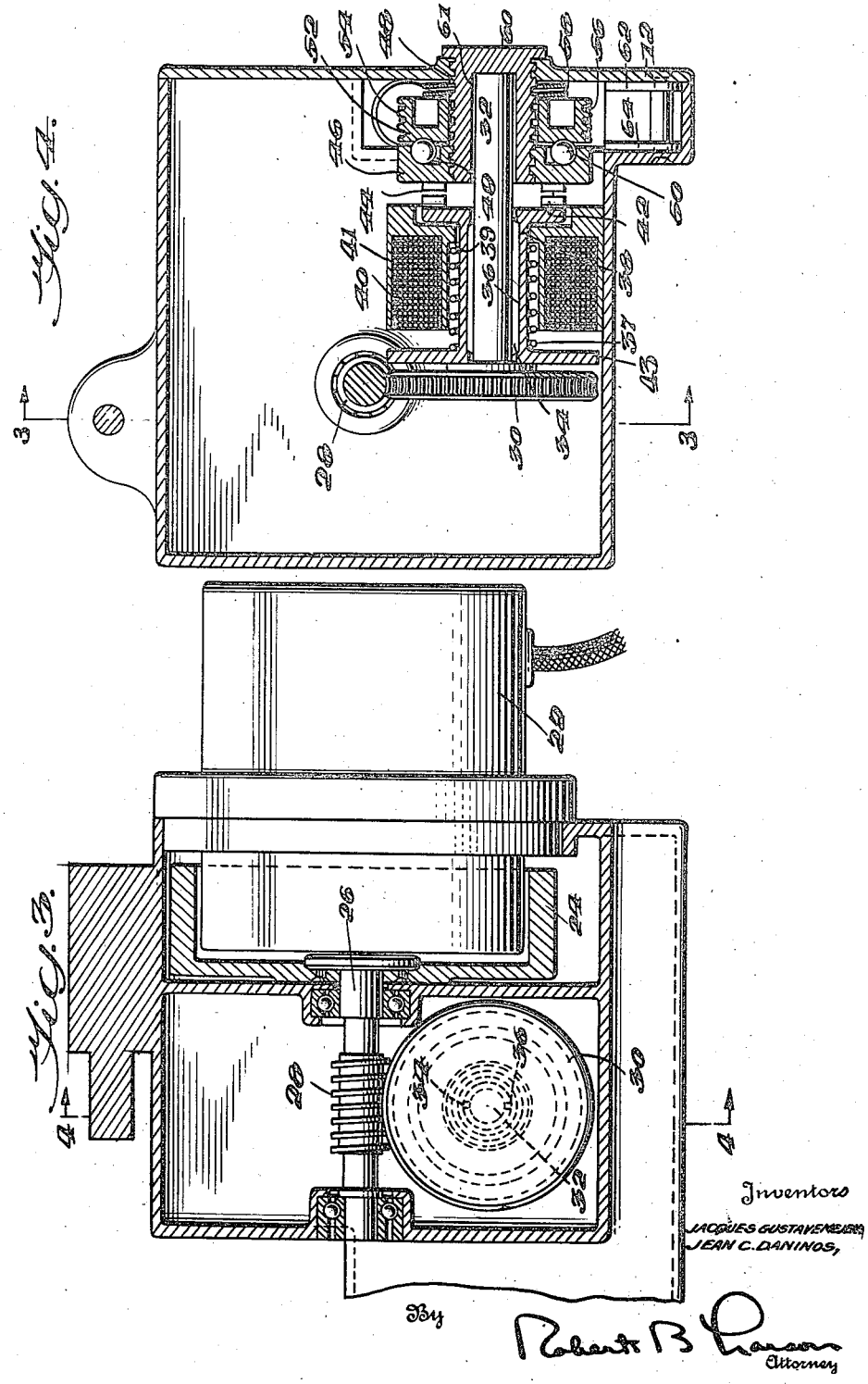

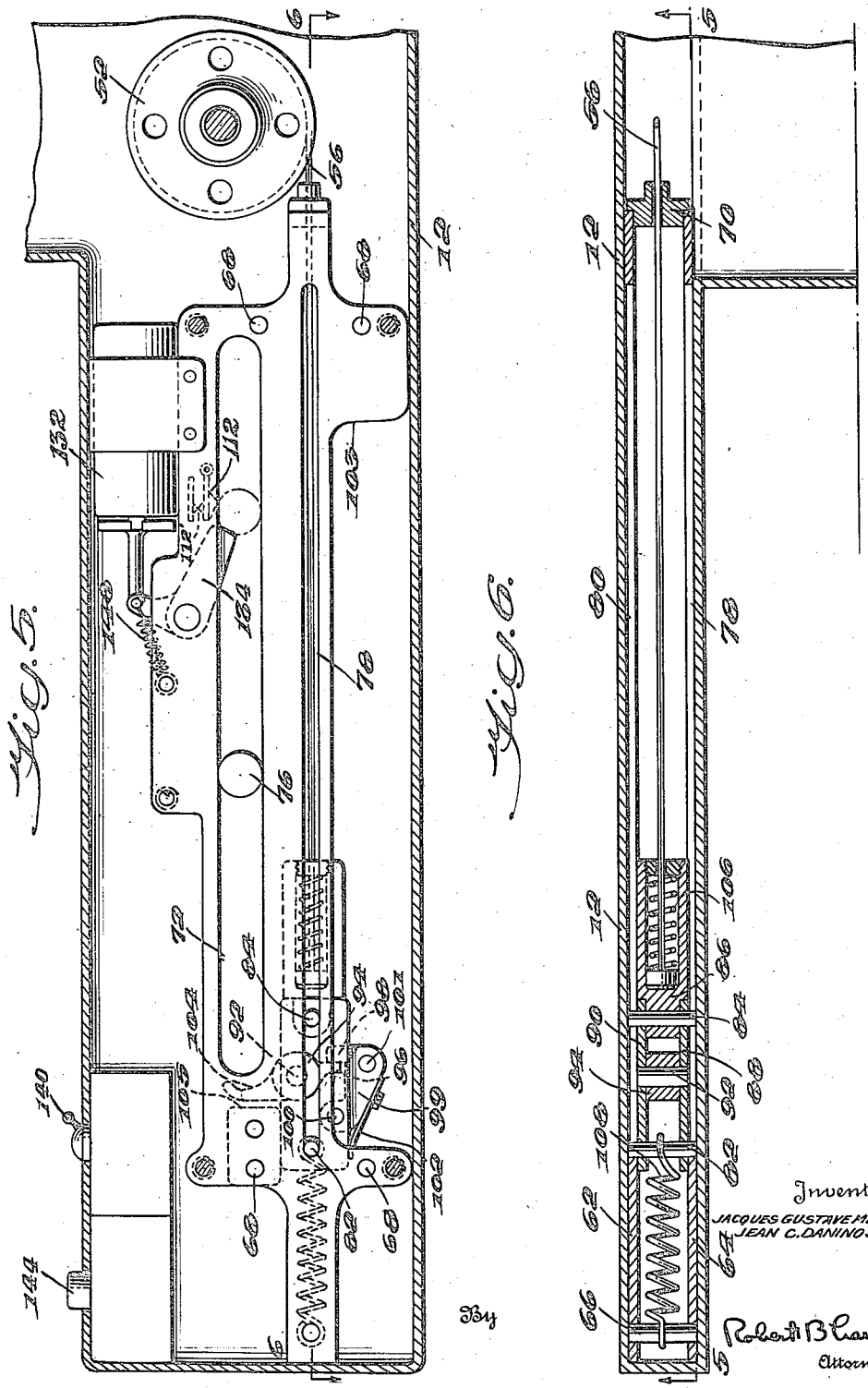

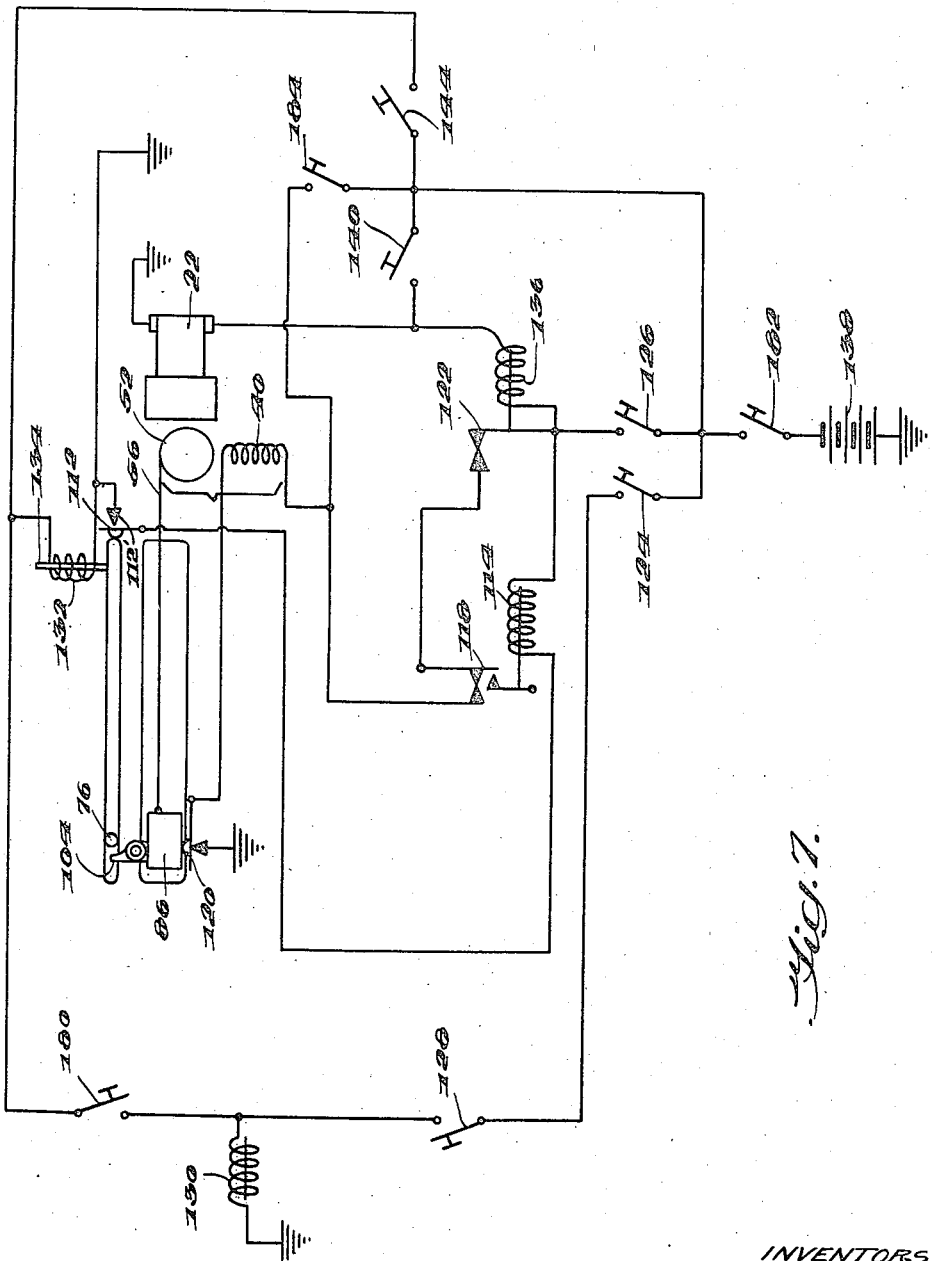

2,413,241

UNITED STATES PATENT OFFICE 2,413,241

RECHARGING SYSTEM FOR MACHINE GUNS

Jacques Gustave Mejean, Westport, and Jean C. Daninos, Darien, Conn., assignors, by mesne assignments, to Charles E. Warner, Jackson Heights, N. Y.

Application June 2, 1942, Serial No. 445,494

4 Claims. (Cl. 89—1)

This invention relates to electromechanical control means for recharging machine guns and the like. More particularly it relates to the control of recharging means for machine guns from a distance where, for example, the guns are mounted in the wings of an airplane.

In the recharging of machine guns in aircraft usually one of several types of systems are employed. For example there is the purely mechanical system in which control is effected through a cable pulled from the cockpit by the pilot. Because of the energy required for recharging (roughly 70 kg.) this system is not used for guns of calibre greater than .30. There is also an electro-pneumatic system in which a cylinder attached to the gun receives compressed air through an electrically operated valve remotely controlled by the pilot. This system has various advantages, but one of its main drawbacks resides in the fact that it requires small compressed air bottles which must be changed before every flight.

As an example of a third system, reference is made to the purely hydraulic type in which oil under pressure from an oil pump operates a piston to move the gun bolt. This system gives rise to a complicated arrangement of power drives, hydraulic pumps, reservoirs, tubes, and valves, and requires frequent bleeding of lines. The operation time of such systems is very slow when subjected to the low temperatures which are met at very high altitudes.

Finally, purely electrical systems have been attempted. While at first thought, a purely electrical system would seem best, it has not been feasible up to the present time. A gun bolt can be driven by an electric motor, which, of course, can be easily controlled at a distance. Unfortunately, however, the effort of 70 kg. necessary during only a small portion of the travel of the gun bolt is a troublesome factor. Assuming that the recharging cycle must be accomplished in ½ second, it can easily be calculated that even with a motor of 100% efficiency, a ⅓ horsepower motor would be necessary, or actually a motor of ½ horsepower. Because of its weight and overall dimensions, such a motor operating on 24 volts (the voltage normally available on aircraft) is out of the question.

It must be noted that one of the difficulties arising in connection with the recharging of machine guns, is due to the fact that the effort is not constant. During the first quarter of the travel of the gun bolt, the effort is more than twice the effort during the other three-fourths of its travel. It is this maximum effort, sometimes under the worst of cold temperature conditions, that requires either a large cylinder, or high pressure, or, in a purely electrical system, a powerful electric motor.

One of the objects of the present invention is to provide an electrical mechanical system using a very small motor and capable of releasing for use only the exact quantity of energy required by the gun, such quantity of energy being, nevertheless, variable from one gun to another and according to temperature. A system according to the present invention is capable of releasing at each moment exactly the necessary amount of energy.

Another object of this invention is to provide an electrical-mechanical system for recharging machine guns or the like, and which employs a small electric motor (1/15 of a horsepower) coupled with a flywheel, and which is adapted to move the gun bolt so that the speed of displacement of the gun bolt will be very nearly constant during the travel.

The invention has for a further object the avoidance of the disadvantages possessed by previous systems.

These and other objects of the invention will be more apparent from the following specification and claims when read in conjunction with the accompanying drawings in which:

Figure 1 is a diagrammatic representation of a plurality of machine guns equipped in accordance with the present invention.

Figure 2 is a perspective view of the housing adapted to be attached to a gun and containing certain features of the invention.

Figure 3 is a sectional view on the line 3—3 of Figure 4 with the motor in elevation.

Figure 4 is a sectional view taken on line 4—4 of Figure 3, the view being revolved 90°.

Figure 5 is a side elevation, with the wall of the housing removed to show the interior of the operating mechanism, taken on the line 5—5 of Figure 6.

Figure 6 is a view taken on the line 6—6 of Figure 5.

Figure 7 is a diagrammatic view of the electrical circuits.

In recharging machine guns the mechanism and control therefor should, at the will of the operator, be capable of:

1. Drawing the gun bolt from a front to a rear position and then releasing it instantly.

2. Drawing the gun bolt from a front to a rear position and then retaining it in such position with a safety device, insuring that even if the trigger is actuated, no shot will be fired.

3. Obtaining automatic recharging should the gun accidently cease firing while the trigger is depressed.

With reference to Figure 1, there is diagrammatically shown a system for accomplishing these desiderata. The reference numerals 10 indicate machine guns which may be mounted, for example, in the wings of an aircraft. These guns are shown as having auxiliary housings 12 secured thereto which contain mechanism for moving the gun bolt in accordance with the conditions enumerated above. The control is electric and is effected through the electrical conduits 14 which lead to junction boxes 16 and through these to a central control box 18 disposed, for example, in the cockpit or operator's compartment.

One of the housings 12, containing the operating mechanism, is shown in perspective in Figure 2. These housings are adapted to be attached to the side of the machine gun by screws 20 or the like.

With reference to Figures 3 and 4, one end of each housing 12 contains a small electric motor 22 adapted to revolve at high speed, say at 20,000 R. P. M. This electric motor drives a flywheel 24 which is mounted on the shaft 26 of the motor.

On the shaft 26 of the electric motor 22 is also mounted a worm gear 28 which is adapted to engage a gear 30 mounted on a shaft 32 journalled in the walls of the housing, and which thus reduces the speed of the shaft 32 considerably, for example, to about 200 R. P. M.

From Figure 4 it is seen that the shaft 32 is provided with splines 34 which engage in corresponding grooves 36 disposed on a core 38 of an electromagnetic solenoid 40 which is rigid with the wall of the housing 12. The electromagnetic core 38 carries at one end the dogs 42 and the construction is such that when the solenoid 40 is energized the magnetic field acts upon the core 38 in such a manner as to move said core laterally (to the right as seen in Figure 4) to a point at which the dogs 42 engage the corresponding dogs 44 which are formed rigidly with the wheel 46. The wheel 46 is then driven and, by virtue of the construction described, revolves at the same speed as the shaft 32. As the wheel revolves it moves longitudinally along its axis because it is threadedly mounted as at 48 as will be described. Eventually, after a certain rotation has occurred, the dogs 42 and 44 disengage in a manner described in detail below. Hence, the core 38, dogs 42 and 44, and the wheel 46 cooperate to serve as clutching means.

During the time the solenoid 40 is energized the core 38 will remain in its laterally extended position. However, upon deenergization of solenoid 40, the core 38 is returned to its original position under the action of the tension spring 37, one end of which abuts against an inwardly projecting collar 39 formed on the supporting frame 41 of the solenoid 40, while the other end of the spring 37 engages against an outwardly extending flange 43 formed rigid with the core 38.

The wheel 46 is provided on one side with a number of sector shaped bearing races 49 in which are set the bearings 50 which also engage corresponding races formed in the wheel 52. The wheel 52 has on its periphery helicoidal grooves 54 adapted to receive a cable 56. The wheel 52 is freely mounted for rotation on the nut 60 and is constantly urged toward the wheel 46 by a spring washer 58. The tension or compression of the spring washer 58 is just sufficient to cause the light engagement of the wheel 52 with the bearings 50 during the time the recharging mechanism is inoperative. As shown in Figure 4, the nut 60 is screwed into the wall of the housing 12 and is provided with a bore 61 in which one end of the shaft 32 is journalled. The outer surface of the nut 60 is threaded and carries the internally threaded wheel 46. Hence, as long as dogs 42 and 44 of the clutch are maintained in engagement the wheel 46 is rotated on nut 60 and during the course of this rotation the bearings 50 are jammed into tighter engagement with wheel 52 and as a consequence of this movement the wheel 52 is caused to rotate. As shown in Figure 4, the wheel 52 is freely mounted for rotation on nut 60.

From the foregoing specification it is readily understood that the energization of the electric motor 22 and the solenoid 40 will, through the mechanism described, cause wheel 52 to rotate and simultaneously effect a movement of the cable 56 which is operatively connected with the recharging mechanism disposed in housing 12. The movement of the cable is relatively short since after a few turns of the wheel 52 the dogs 42, 44 of the clutch disengage.

With reference to Figures 5 and 6, it will be seen that the housing 12 has mounted therein a unit comprised of two parallel frames 62 and 64 held in spaced relation to one another by the spring retainer 66, four screws 68 and a cable guide 70. Each frame 62 and 64 is provided with a longitudinal slot, these slots being in register with each other and being indicated by the reference numeral 72. Within these slots the gun bolt 76 is adapted to move forwardly and rearwardly, the edges of the slots constituting a guide.

A second set of registered slots indicated as 78 and 80 is disposed in the frame members 62 and 64 below the slots 72. Between the two frame members 62 and 64 and guided by two pins 82 and 84 which slide in the slots 78 and 80, is a moving assembly 86. This assembly is adapted to be drawn rearwardly by the cable 56, to which it is secured by means which will be described.

The assembly 86 is composed of two side plates 88 and 90, bearing a pin 92 on which is mounted a part 94 capable of pivoting around the axis of pin 92.

When the part 94 is disposed vertically (see Figure 5), its arm 96 engages a projection 98 on a member 99 capable of turning around a pin 100 supported by the plates 88 and 90. The projection is urged upwardly by a spring 102 toward the part 94. In this position the part 94 cannot pivot around the axis 92 in a counterclockwise direction. If, however, the member 99 is pushed downwardly against the action of the spring 102 so that the projection 98 is moved out of the way, the arm 96 is free and part 94 can then pivot about the axis 92. When the projection 98 is released it moves upwardly, retains the part 94, and prevents it from coming back to the original vertical position (indicated in Figure 5) unless the other arm 104 of the part 94 is pushed in such a way as to produce a clockwise rotation of the arm 96 causing it to push downwardly against and snap over the projection 98.

The cable 56, as shown in the figures, is fixed to the moving assembly 86, preferably by means of a spring 106. Another spring, 108, insures the return of the assembly to its original position.

In operation the cable 56, as seen in Figures 5 and 6, is drawn to the right (rearwardly of the gun) upon rotation of the wheel 52 as described. The cable pulls with it the sliding assembly 86. As this assembly moves to the right, the upper arm 104 engages the gun bolt 76 and moves it rearwardly against a force tending to urge the gun bolt in the opposite direction until the gun bolt reaches the end of its rearward stroke. Just as the bolt 76 is about to reach the rear end of the slots 72 a cross pin 101, on the member 99 of the assembly and projecting laterally therefrom, strikes the edges of the frames 62 and 64 as at 103, thus causing the member 99 to pivot downwardly about its pivot point 100 against the action of the spring 102.

The above-mentioned force acting on the bolt 76 causes the arms 104 and 96 to pivot in a contra-clockwise direction about the axis 92, since the member 94 has now been released from the locking action on the projection 98 of the member 99 by the above described downward movement thereof. The gun bolt 76 thus escapes from the arm 104 and passes over it to the forward end of the slots 72.

At the moment the arm 104 releases the gun bolt 76 the wheels 46 and 52 have been moved to the right to such an extent (as viewed in Figure 4) that the interlocked dogs 42, 44, have become disengaged and the movable core 38 carrying the dogs 42 is returned to its original position under the action of the spring 37, the electromagnetic coil 40 having been deenergized in order to permit this action to take place.

The spring 108 then returns the moving assembly 86 to its forward position, the arm 104 being retained in lowered position. As the assembly moves toward its forward position the cross pin 101 is moved out of engagement with the abutment 103 and the projection 98 is forced upwardly, under the influence of spring 102, into contact with the under surface of the arm 96 which has rotated into a substantially horizontal position.

When the sliding assembly 86 has reached the end of its forward travel the arm 104 (still in its lowered position) strikes the abutment 105 which is rigidly secured to frame members 62 and 64, and this results in turning the member 94 clockwise. In so turning, the arm 96 forces the projection 98 downwardly until it snaps over the end of arm 96 and retains it in the position shown in Figure 5, where the device rests until further charging or recharging is necessary.

It will be understood that simultaneously with the return of the assembly 86, the cable 56 is moved in a reverse direction causing wheels 46 and 52 to rotate also in the reverse direction on the plug 60. The turning of the wheels in the last mentioned direction moves wheels 46 and 52 to move laterally, that is, to the left as seen in Figure 4, until they assume their original position.

The invention, as indicated, contemplates an automatic recharging system which will operate as soon as the gun is jammed while the trigger switch is closed. For this phase of the invention reference is made to the wiring diagram shown in Figure 7.

Let it be assumed that the plane is on the ground and is to be prepared for take-off and combat duty. Under these conditions all of the manually operated switches 124, 126, 128, 140, 144, 180, 182 and 184 shown in Figure 7 are in the open position while the solenoid operated switches 118 and 122 are closed. The carriage 86 is in the position shown thereby closing switch 120 and the gun bolt is in its rearward position (shown in broken line, see Figure 5) behind safety element 134 thereby maintaining a resiliently mounted switch 112 in closed position against the fixed and ground switch element 112'. Since the main switch 182 is open no current will flow in any of the circuits.

The armorer now closes switch 182 disposed in the cockpit, and checks switch 180 also in the cockpit to make certain it is open. The old ammunition is then removed and the switch 140 is then closed to start the recharging motor 22. The push button switch 144 is then operated thereby energizing solenoid 132 which acts to elevate the safety element 134, spring biased at 148. The elevation of this element releases gun bolt 76 and it moves to its forward (full line, see Figure 5) position, and comes to rest. New ammunition is then fed to the gun. Thereafter, switch 184 is actuated to energize solenoid 40 thereby recharging the gun as described above. However, since the push button switch 144 has returned to its open position the solenoid 132 has become deenergized and safety element 134 has again dropped into the path of the gun bolt. Hence, the gun bolt is retained in safety position behind element 134 while carriage 86 returns to its original position upon opening of switch 184 and the consequent deenergization of coil 40 and disengagement of dogs 42, 44 as described. The armorer then closes switch 180 and opens switches 140 and 182 to complete the gun servicing operation.

On take-off and during normal flight, the pilot closes the cockpit switches 124 and 126 while ascertaining that main switch 182 is in open position. These conditions are maintained until the plane enters the potential combat zone whereupon the pilot closes switch 182.

In closing switch 182 solenoid 114 is energized and acts to open switch 118. The solenoid 114 is constructed so as to have a quick operating time (for example, 0.01 second) and a slow release time (of the order of 0.4 second). The recharging motor 22 is also energized. The solenoid 136, connected in series with the motor 22, is constructed in such a manner that, during normal motor operation the current through the solenoid is insufficient to actuate switch 122 and cause it to open.

Upon engaging in combat, the pilot closes switch 128 thereby energizing solenoid 132 and releasing the gun bolt 76. The firing pin solenoid 130 is also energized to cause the gun to fire.

Under normal firing conditions the gun bolt 76 moves backwardly and forwardly in the slots 72, and on each trip throws the resilient switch 112 which is connected in series with solenoid 114 of the automatic switch 118. The periodic operation of switch 112 maintains solenoid 114 in an energized condition whereby switch 118 is kept open and coil 40, in series with switch 118, is hence deenergized.

If it now be assumed that for some mechanical reason the gun bolt jams, after an interval of approximately 0.4 second the solenoid 114 becomes deenergized (since switch 112 is no longer periodically operated) and switch 118 closes completing the circuit to coil 40. This operation causes the dogs 42, 44, to engage whereby the recharging operation (supra) is initiated. The increase in load on motor 22 during the time the carriage 86 is moved rearwards demands heavier current and hence the flow of current through the solenoid 136 is correspondingly greater and switch 122 opens. The opening of switch 122 breaks the circuit to coil 40 which then becomes deenergized whereby the carriage, upon returning to its original position remains there at rest.

It is to be understood that during the operations just described the pilot has not released the trigger switch 128, and that as soon as the recharging operations have been completed the gun resumes normal firing until trigger switch 128 is released.

Should the pilot cease firing while the gun bolt is in its forward position, the recharging mechanism will automatically operate to move the gun bolt 76 rearwardly to its locked position behind the safety 134.

If the pilot ceases fire while the gun bolt 76 is behind safety 134, the solenoid 132 being deenergized drops the safety in the path of the gun bolt thereby restraining its forward movement.

Assuming that the combat engagement has terminated the pilot readies the plane for landing by opening the main switch 182 and safety switch 180. Upon landing the remaining manually operated switches are opened, whereby all circuits are broken.

While the preferred embodiment of this invention has been described and illustrated, it will be understood that changes may be made in the construction, combination and arrangement of parts, without departing from the spirit and scope of the invention as claimed.

We claim:

1. In a device of the type described, having a reciprocating breech bolt for charging, a small constantly energized electric motor including a shaft, a flywheel mounted on the shaft of said motor to rotate therewith, mechanism constructed and arranged to engage said breech bolt and driven by said motor shaft to retract said breech bolt, and clutch means for connecting said mechanism to said motor shaft.

2. In a device as described in claim 1, and means for releasing said breech bolt from engagement with said mechanism.

3. In a device of the type described in claim 1, and means for actuating said clutch means to connect said mechanism to said motor, and automatically operated means for actuating said clutch means to disconnect said mechanism from said motor.

4. In a device of the type described in claim 1, and electrical means for actuating said clutch means to connect said mechanism to said motor, and automatically operated mechanical means for actuating said clutch means to disconnect said mechanism from said motor.

JACQUES GUSTAVE MEJEAN.
JEAN C. DANINOS.